(No Model.)  J. F. KELLER.  4 Sheets—Sheet 1.

FERTILIZING GRAIN DRILL.

No. 318,478.  Patented May 26, 1885.

Attest:
W. D. Harrington.
E. Fred Keller.

Inventor
John F. Keller.
By J. M. Kay
Attorney.

(No Model.) 4 Sheets—Sheet 2.

J. F. KELLER.
FERTILIZING GRAIN DRILL.

No. 318,478. Patented May 26, 1885.

Attest:
W. D. Harrington.
Fred. Keller.

Inventor:
John F. Keller.
Attorney.

(No Model.) 4 Sheets—Sheet 3.
J. F. KELLER.
FERTILIZING GRAIN DRILL.
No. 318,478. Patented May 26, 1885.
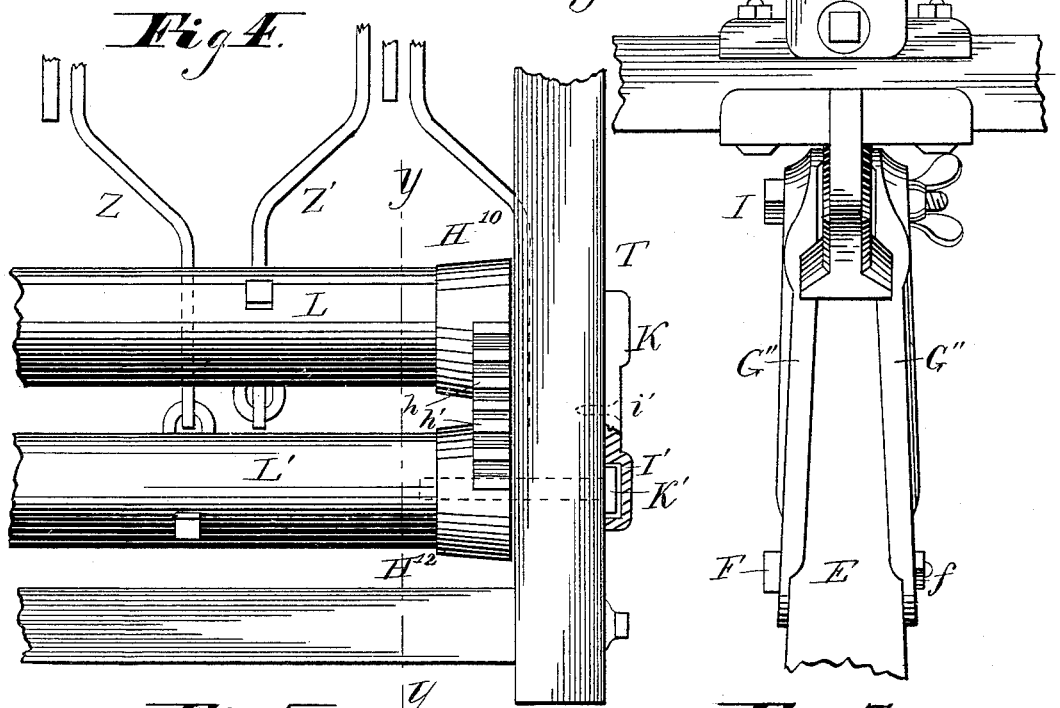
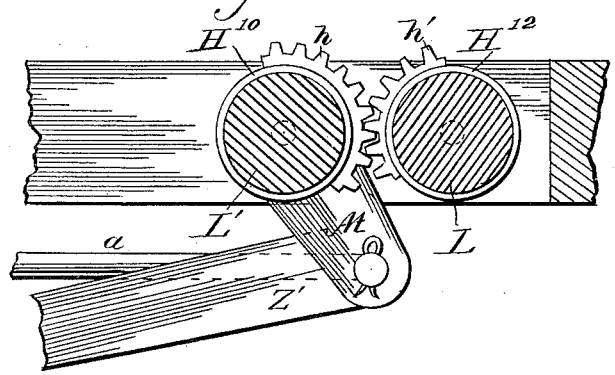
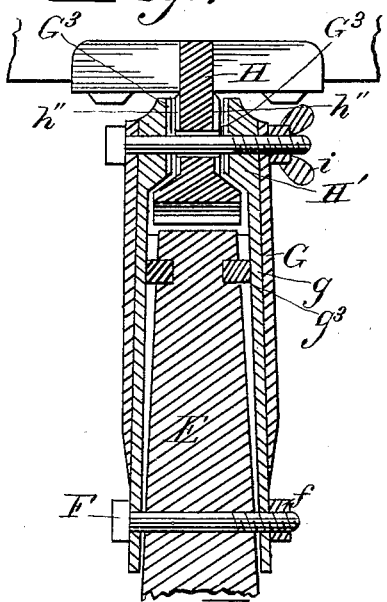
Attest:
W. D. Harrington
C. Fred Keller
Inventor
John F. Keller
By J. A. Kelly
Attorney (No Model.) 4 Sheets—Sheet 4.

J. F. KELLER.
FERTILIZING GRAIN DRILL.

No. 318,478. Patented May 26, 1885.

Attest:
W. D. Harrington.
C. Fred Keller.

John F. Keller.
Inventor.

by _____
Attorney.

United States Patent Office.

JOHN F. KELLER, OF SHEPHERDSTOWN, WEST VIRGINIA.

FERTILIZING GRAIN-DRILL.

SPECIFICATION forming part of Letters Patent No. 318,478, dated May 26, 1885.

Application filed November 19, 1883. (No model.)

*To all whom it may concern:*

Be it known that I, JOHN F. KELLER, a citizen of the United States, residing at Shepherdstown, in the county of Jefferson and State of West Virginia, have invented certain new and useful Improvements in Grain-Drills, of which the following is a description.

The invention relates particularly to that class of grain-drills which are used for the simultaneous distribution of seeds and fertilizing materials; but several of its leading features are applicable also, with equally useful results, in drills which discharge grain only.

The invention consists in certain novel combinations of elements whereby the line of draft may be readily changed to adapt it to the height of the animals which are employed in the propulsion of the carriage; whereby the frame which carries the boots and teeth may be tilted, so as to change the inclination of the teeth in relation to the surface of the ground; whereby the discharge of grain and fertilizing substances is discontinued whenever a backward movement of the machine is begun; whereby the shifting-bars, by which the boots and teeth are changed in position, are rendered readily removable from their places in the frame; whereby the discharge-orifices in the bottom of the fertilizer-hopper are varied in their dimensions; whereby the discharge-orifices are closed, and in various novel features in the construction of the apparatus by which it is rendered more effective in the performance of the various operations which it is designed to accomplish.

Figure 1:
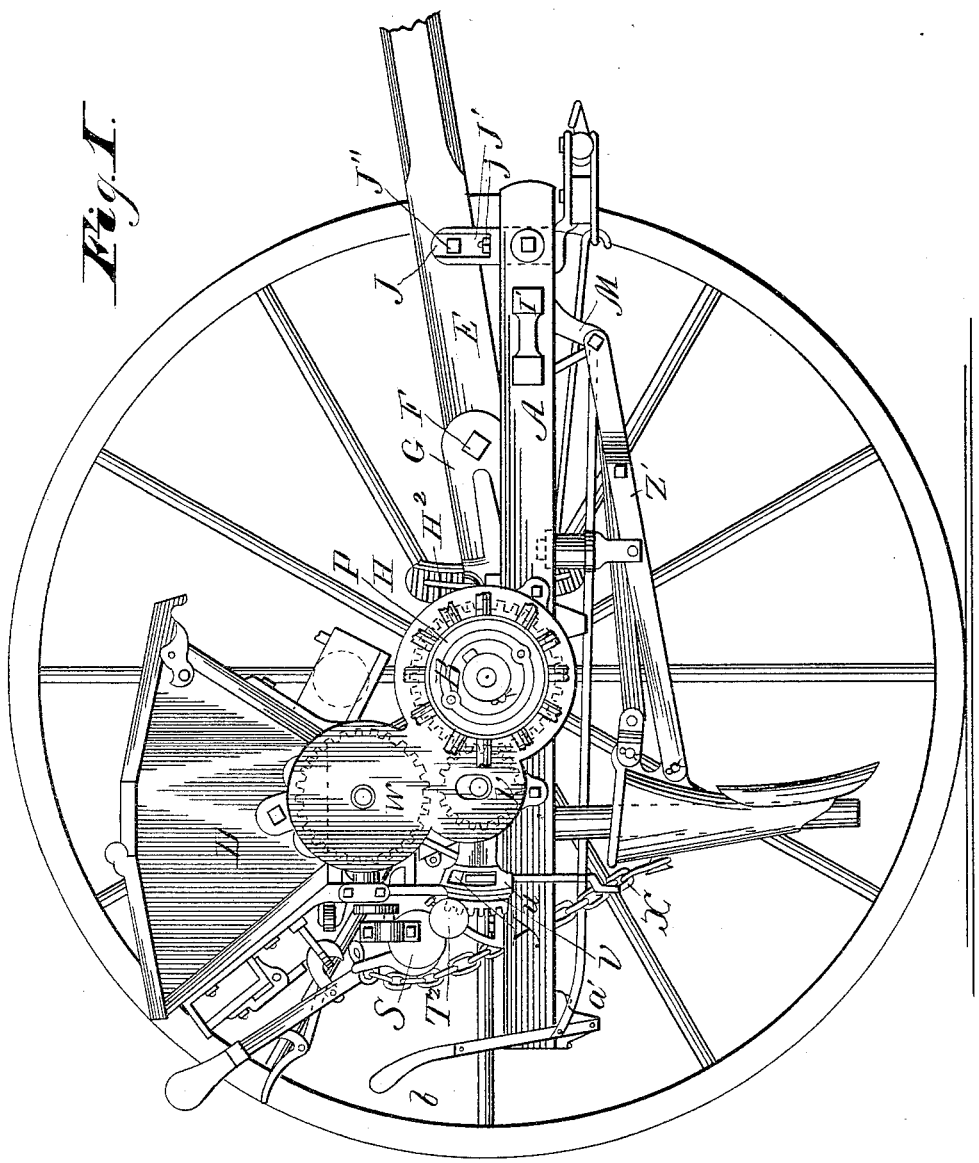
Figure 2:
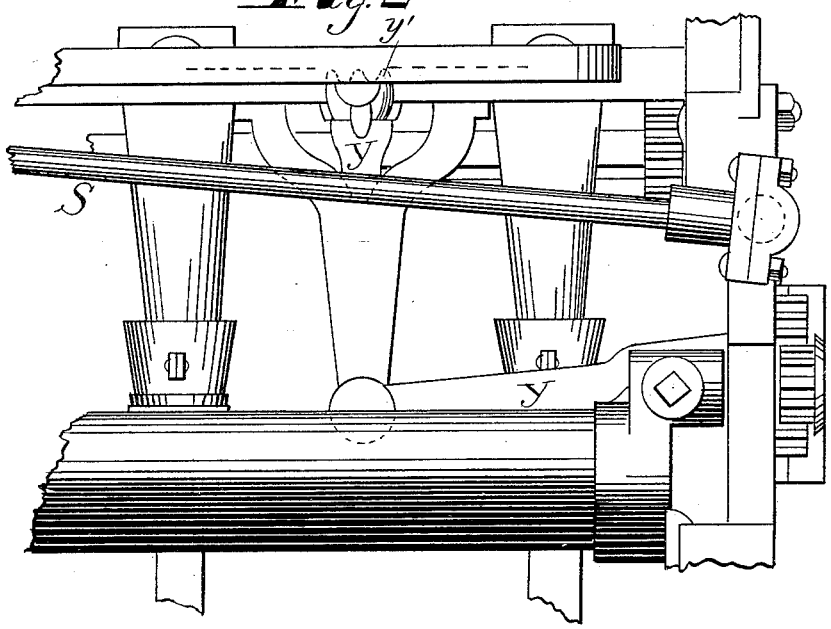
Figure 3:
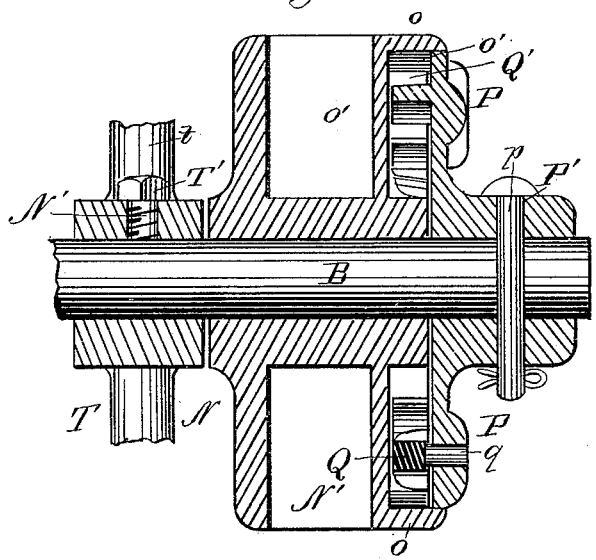
Figure 8:
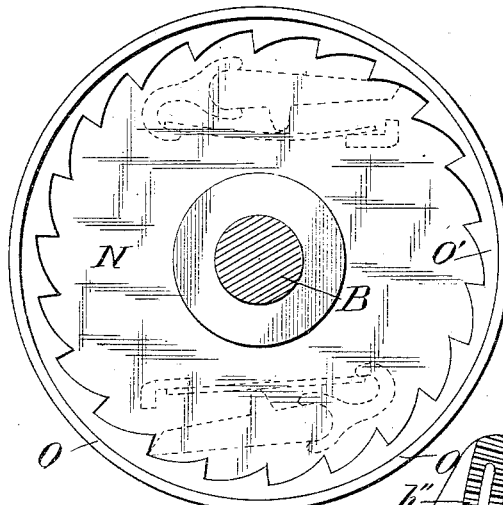
Figure 9:
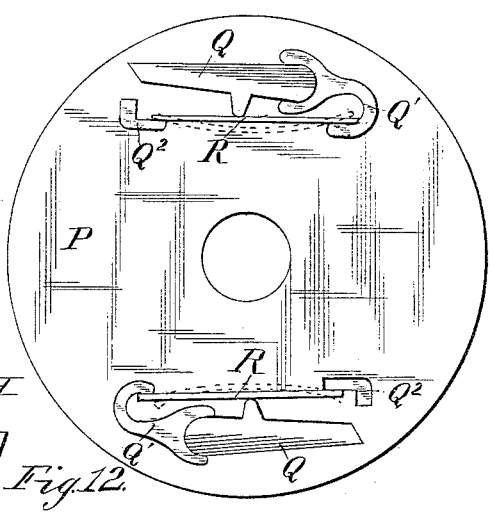
Figure 12:
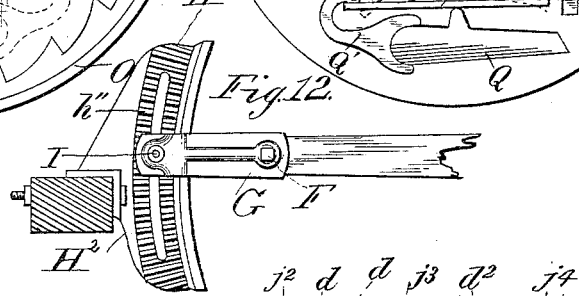
Figure 10:
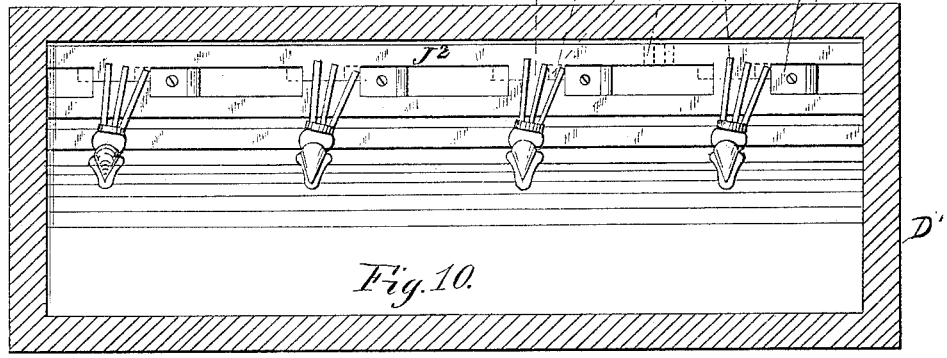
Figure 11:
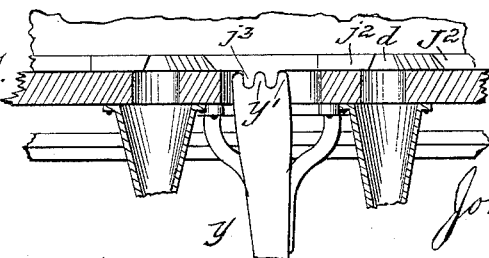

In the drawings, Figure 1 represents a side elevation of the machine viewed from the right thereof, the wheel on that side being broken away to a point near the hub. Fig. 2 represents a rear elevation of the right upper portion of the body of the drill. Fig. 3 is a longitudinal central section through the hub of the right wheel, its cap, and a portion of the gear-wheel, portions being shown in perspective. Fig. 4 is a plan view representing the relation of the shifting-bars and of the drag-bars to the frame. Fig. 5 is a vertical section on the line $y$ $y$ of Fig. 4 and looking in the direction of the arrow, toward the left of the machine. Fig. 6 is a top plan view showing the connection of the pole of the vehicle with the frame thereof. Fig. 7 is a longitudinal horizontal section through the rear portion of the pole and its connections. Fig. 8 is an end view of the hub at the right of the machine, the cap of the hub being removed therefrom. Fig. 9 is a plan of the inner face of the detachable cap. Fig. 10 is a plan view of one division of the fertilizer-hopper, showing the discharge-orifices in the bottom of the same, and the slides and agitating-fingers, which operate in connection therewith. Fig. 11 is a detail representing a vertical section on the line $z$ $z$ of Fig. 10. Fig. 12 is a side elevation showing the means by which the pole is connected to the frame and by which it is made vertically adjustable.

In Figs. 1, 6, 7, and 12 are represented the means by which the pole or tongue of the vehicle is attached to the frame thereof and whereby it is made vertically adjustable at its rear.

To the rear cross-bar of the frame A is attached a securing stud or segment, H, the central projecting portion of which is enlarged near its outer extremity by shoulders H' H', and the sides of which, behind the shoulders, are provided with longitudinal grooves $h''$ $h''$. A slot, H², curved to correspond with the curvature of the outer end of the stud, extends transversely through it from a point near the upper to a point near the lower extremity of the same, as seen in Figs. 1 and 12. At a suitable distance from the rear end of the pole a bolt, F, extends through the same from side to side, and also through the ends of clamping-plates G G, a nut, $f$, serving to tighten the plates upon the pole. The clamping-plates are provided at the top and at the bottom with inwardly-projecting flanges G', which overlap the pole, as shown. The clamping-plates G terminate rearwardly in inwardly-projecting shoulders or jaws G², which are beveled, as shown, to correspond with the beveled portions of the segmental stud H, and which are provided upon their inner vertical faces with longitudinal projections G³, which correspond in depth and length with the grooves $h''$ in the lateral surfaces of the stud H.

Extending through the jaws G² of the clamping-plates and through the curved slot H² of the stud H is the securing-bolt I, upon the threaded end of which is the thumb-nut $i$.

Formed in the body of the pole at the sides thereof are cavities $g^3$, to receive springs $g$, of rubber or other suitable material.

It will be seen that by means of the appliances described the direction or line of draft of the pole E may readily be changed. If it be desired to depress the outer end of the pole, the thumb-nut $i$ upon the securing-bolt I will be loosened, releasing the projections $G^3$ from engagement with the grooves $h''$ in the stud. The clamping-plates will thereupon be thrown outwardly by the action of the springs $g$, and the bolt I being free to move upwardly in its slot, the main body of the pole is relatively depressed by such movement, and the whole is again secured in position, as before, by means of the thumb-nut $i$.

Secured upon the front cross bar of the frame A by bolts $j j$ is a plate, J, from which rise two short posts or standards J' J' at such a distance apart as to embrace between them the pole E, a bolt, J'', which extends through the standards and through the body of the pole serving to connect the pole and the cross-bar together.

It will be observed that the movement by which the pole is depressed at its front and elevated at its rear, operates also to depress the frame at its front and to elevate it at its rear, thereby elevating in a corresponding degree the teeth of the drill. By this means, when a light team is employed, the engagement of the teeth with the soil is diminished in proportion to the height and the strength of the animals, and it becomes practicable to adjust the teeth of the drill to the condition and requirements of the ground.

It is obvious that the clamping-jaws and the adjusting segmental stud might be transposed without affecting the principle of the operation; but the construction shown has given satisfaction in practical use, and I prefer to employ it.

In Figs. 1, 3, 8, and 9 are represented the devices which are employed in connection with the hubs of the carriage for discontinuing the transmission of motion from the axle to the apparatus by which the seed and fertilizing materials are discharged, the cap P of the hub being shown in Fig. 1; the cap, the securing-pin $p$, the axle B, the hub N, the spoke-sockets N', the flange O, the serrations O', one of the sockets or keepers Q', one of the pawls Q and its pivot-pin $q$, and the hub T, set-screw T', and spokes $t$ of the gear-wheel being shown in Fig. 3; the body N of the hub, the rim or flange O, the serrations O', and the axle B being shown in Fig. 8, and the inner face of the cap P, the sockets or keepers Q' and Q², the pawls Q and the springs R being shown in Fig. 9.

Referring to Fig. 3, it will be observed that while the hub of the gear-wheel is fixed upon the axle-tree B by means of the set-screw T', the hub N of the main wheel is free to revolve upon that axle. When the pin $p$ is removed from the openings $p' p'$ in the detachable cap and from the opening $p''$ in the axle-tree and the cap P is detached from its position upon the axle and within the rim O, the pawls Q, upon the cap turning slightly upon their pivots $q$, will assume the position indicated in Fig. 9. When the cap is to be inserted in place, it is necessary, first, to slightly depress the points of the pawls in order to permit them to pass into engagement with the serrations O', in the manner indicated in dotted lines in Fig. 8. It will be apparent that a forward movement of the drill will operate to press the point of the pawl, which is in contact with one of the serrations, forcibly against the same, and thus impart the motion of the wheel to the cap P, and through it to the axle B, to which the cap is secured by the pin $p$. Under this condition the mechanism which receives motion from the gear-wheel, will continue to operate in the usual manner; but on a reverse movement of the vehicle, as in turning the machine about at the boundary of the field, the points of the pawls will be thrown out of engagement with the notches or serrations, and, as a consequence, the wheels of the drill will cease to communicate motion to the gear-wheel and its connections, thus effecting a saving of the grain and fertilizing material which would be lost under any construction which would permit their continuous discharge. It will be noted that the keepers are in such relation to the serrations that but one of the pawls will be in full engagement at any time, the other alternating therewith in the manner shown. In very heavy drills it may, however, sometimes be desirable to so arrange the parts that the pawls shall be in simultaneous engagement. Under this construction, as will be seen, the ratchet-teeth are formed with the hub, and the keepers are formed with or rigidly secured to the detachable cap, near the periphery of the same, so that the pressure upon the pawls is exerted in the direction of their length, wholly avoiding any transverse or oblique strain upon them. It will be seen, further, that under this construction whenever the cap is in its place the pawls are at all times in contact with the serrations upon the inner face of the flange, in readiness to be brought into immediate action.

In Figs. 1, 4, and 5 are represented the parts by which the position of the drill-boots and their attachments may be readily changed from a single rank to two ranks, or from two ranks to a single rank, as may be desired. Upon the ends of each of the two shifting or adjusting bars L and L', which are secured between the right and left bars of the frame A, are fixed the ring-caps $H^{10}$ and $H^{12}$, upon the cylindrical portion of each of which is a raised portion, which is provided with a series of serrations, $h$ and $h'$, which gear together in the manner indicated in Fig. 5.

To the bar L are attached the drag-bars Z, and to the bar L' are attached the drag-bars Z', the bars Z and Z' being arranged in alternation, as seen in Fig. 4. At their ends the shifting-bars L L' are pivotally supported upon the frame A by means of detachable journal-pins K and K', which are inserted through suitable orifices in the frame and in the ends of the bars, and are secured against displacement by means of a recessed cap, I', which in turn is attached to the frame by a screw, $i'$, or equivalent means. An arm, M, projecting downwardly from the under surface of the rear shifting-bar, L', is connected to one of the drag-bars, and it is also connected by a rod, $a$, with the shifting-lever $b$, which is pivotally connected with the rearwardly-projecting ends of the side pieces of the frame A, or with a lug, $a'$, which projects downwardly therefrom, as seen in Fig. 1.

Under the operation of the lever $b$ a series of drill-teeth may be readily moved out together to a point in advance of the remaining alternate members, or as readily returned to place when desired.

It will be understood that, with the exception above noted, the drag-bars will be connected directly to the shifting-bars by hooks and staples in the usual manner.

The means by which the fertilizer-discharge orifices are varied in dimensions are represented in Figs. 1, 2, 10, and 11.

The cog-lever U, Fig. 1, is provided with a vertical slot, $u$, to receive the end of an elbow-lever, Y, Figs. 1 and 2, the vertical arm of which, as seen in dotted lines in Fig. 2, is provided upon its curved upper extremity with teeth $y'$, which are adapted to engage with corresponding teeth, $j^3$, which project downwardly from the bottom surface of the slides $J^2$ in the fertilizer-hopper. By means of a set-screw, X, which has its bearing in the cog-lever, and which projects into the lower extremity of the slot $u$, where it is brought into contact with the end of the lever Y, the area of the discharge-openings is regulated at pleasure.

The lifting-bar S, to which the boot-chains are connected, carries an eccentric pinion, $T^2$, which engages with the cog-lever U, already described, which in turn supports the journal of pinion V, the bearing of which is vertically elongated, as seen in Fig. 1, so that when the boots are lifted the engagement of the pinion $T^2$ with the lever U causes such lever to move downwardly, thus depressing the pinion V, so that it will be released from engagement with the wheel W, from which it receives the motion which it imparts to the rollers and stirrers of the seed-discharging mechanism. On the contrary, when the boots are lowered to their operative position the pinion V is brought into engagement with the wheel W, again uniting the seed-discharging with the seed-sowing mechanism, for effective co-operation, the discharge-openings in the hoppers being unclosed, and the drill-teeth being in engagement with the soil.

By reference to Fig. 1 it will be seen that the frame A of the drill is placed below the axle of the wheels, which latter are of considerably greater diameter than those usually employed in this class of machines. This construction insures the most effective application of the power exerted upon the wheels—an advantage of great practical importance in itself, as well as in the facility afforded by this construction, for supplying material to the hoppers. The frame being placed below the axle, the hoppers are, as a consequence, correspondingly depressed, thus affording ready access to the top of the same.

In Fig. 10 is seen the rear compartment of fertilizer-chamber D' of the hopper D, $J^2$ being the slide which, by its lateral projection, $j^2$, closes the openings $d$ in the bottom of the chamber, the cogs or teeth $j^3$ upon the lower surface of the slide being indicated in dotted lines, $j^4$ being a series of stops which are fixed by the side of the openings, and $d^2$ indicating the clearing fingers or stirrers. The discharge-openings $d$ are slightly enlarged downwardly and the slides fit closely upon the surface in which the openings are made, so that the edges of the lateral projections $j^2$, being made thin, accumulations of incrusted or solidified fertilizing material may the more certainly be detached and discharged.

It will be apparent that a key or spline adapted to be inserted in the direction of the length of the axle may be employed, instead of the set-screw T', for securing the gear-wheel.

I am aware that a gear-wheel and a cam-slotted wheel have been located beneath and within a recess in the seed-box of a seeding-machine, and have been so connected by means of spring-actuated arms that seed will be discharged when the cultivating-teeth of the machine are in engagement with the soil and will be retained when the teeth are lifted from the ground.

I am also aware that the axle of a seeding-machine has been provided with a slidable ratchet-clutch and with mechanism connecting with the feed-shaft of the seed-discharging apparatus, by which the volume of grain discharged may be regulated at will, independently of the rate of speed at which the vehicle is being propelled.

I am also aware that in a corn-planter the hubs of the wheels have been provided with a recess in which are provided, at equal distances, three weighted pawls, which alternately engage with a ratchet upon the end of the axle-tree or wheel-shaft, and which are disengaged by a backward movement of the wheel. I am not aware, however, that in any agricultural or other vehicle the hub has been provided with a flange upon the inner face of which are serrations or ratchet-teeth, and with a detachable cap which has upon its inner face, near its periphery, spring-pawls, which, when the cap is in position upon the hub, engage with the ratchet-teeth upon the flange, the ratchet-teeth and the pawls, when the cap is in place, all being near the periphery of the hub, so that the greatest possible leverage of the hub is exerted with the least possible strain upon the parts.

I am aware that in cultivators a crank axle-tree journaled upon a frame has been employed to raise or to lower the teeth of the cultivator; but I am not aware that a straight or uncranked axle-tree has ever been placed above the frame in a grain-drill so as to combine the advantages of wheels of great diameter and low-down grain and fertilizer boxes.

Having described my invention, I claim—

1. The combination, with the shouldered stud upon the rear cross-bar, of the pole E, provided with shouldered clamping-jaws.

2. The combination of the cross-bar having shouldered and slotted stud, the pole provided with shouldered clamping-plates, and the adjustable bolt I.

3. The combination of the cross-bar, the slotted and grooved stud upon the cross-bar, the clamping-plates having projections which are adapted to engage with the grooves upon the stud, and the adjustable bolt adapted to the slot in the stud.

4. The combination, with the pole E, of the shouldered clamping-plates and the springs g.

5. The combination, with the pole E, of the clamping-plates G G, flanged as described, and pivotally secured to such pole and adjustably secured to the stud H, substantially as set forth.

6. In a grain-drill, the combination of a front cross-bar, vertical posts or standards secured upon such cross-bar, a pole or tongue pivotally secured between such posts or standards, a rear cross-bar in front of and independent of the axle-tree of the drill, a stud which is provided with a vertical curved transverse slot and with an enlarged outer end projecting from the front of such rear cross-bar, clamping-plates which are attached to the sides of the pole or tongue and which engage the projecting stud behind the enlarged outer end of the same, and an adjusting-bolt which extends transversely through the clamping-plates and through the curved slot in the projecting stud.

7. The combination, with the pole E, of the securing-bolt J'', the pivot-bolt F, and the adjustable bolt I.

8. The combination of the stud H, fixed to the frame, transversely slotted, and longitudinally grooved, as described, with the pole E, having spring-actuated clamping-plates which are adapted, as described, to engage with the grooves in the stud.

9. The combination, with the axle-tree B of the drill, of the hub N, having flange or rim O and serrations O', and the detachable actuating-cap P.

10. The combination, with the axle-tree B of the drill, of the hub N, having serrations or stops, and the cap P, provided with keepers Q' and Q² and spring-pawls Q.

11. The combination, with the axle-tree B of the drill, of the hub N, having flange O and serrations O', and the cap P, having pivoted spring-pawls which are adapted, as described, to engage with the serrations upon the hub.

12. The combination of an axle-tree, driving or ground wheels upon such axle-tree, a projecting hub upon such wheels, a flange or rim projecting outwardly from such hub, serrations upon the inner face of such flange, and a detachable cap which has a central perforation by which it is fitted upon the axle-tree, a transverse perforation to receive a securing-pin, and spring-pawls secured upon its inner face for engagement with the serrations upon the inner surface of the flange.

13. In the running-gear or carriage of a grain-drill, the combination of an axle-tree which has a transverse perforation near each end thereof, a hub upon such axle-tree, an annular flange upon the outer end of such hub, serrations upon the inner face of the annular flange, a detachable cap which is provided with a longitudinal perforation to receive the axle-tree, which is provided also with a transverse perforation to receive a securing-pin, which is provided also with keepers, and which is provided also with spring-pawls which are in engagement with the serrations upon the flange when the vehicle is moved forward, and which are disengaged from such serrations when the vehicle is moved backward, and a securing-pin which extends through the transverse perforation in the detachable cap and through the transverse perforation in the axle-tree.

14. A grain-drill the carriage of which is provided with an axle-tree, each of the wheels of which has upon its hub a detachable non-adjustable cap which is provided with a pawl which is in engagement with the hub when the wheel is revolved in one direction, and which is thrown out of engagement with the hub when the wheel is revolved in the opposite direction.

15. In the running-gear or carriage of a grain-drill, the combination of an axle-tree which has a transverse perforation near each end thereof, a hub upon such axle-tree, an annular flange upon the outer end of such hub, serrations or ratchet-teeth upon the inner face of the annular flange, a detachable cap which is provided with a longitudinal perforation to receive the axle-tree, which is provided also with a transverse perforation to receive a securing-pin, which is provided also with keepers, and which is provided also with spring-pawls which are pivoted upon the face of such cap, and at their pivoted end are seated in such keepers, and a securing-pin which extends through the transverse perforation in the detachable cap and through the transverse perforation in the axle-tree.

16. In the running-gear or carriage of a grain-drill, the combination of an axle-tree which has a transverse perforation near each end thereof, a hub upon such axle-tree, an annular flange upon the outer end of such hub, serrations upon the inner face of such annular flange, a detachable cap which is provided with a longitudinal perforation to receive the axle-tree, which is provided also with a transverse perforation to receive a securing-pin, which is provided also with two pairs of keepers, one member of each pair of which serves as a seat for a spring and also for a pawl, and the other member of which serves as a seat for a spring alone, and which is provided also with pawls and with springs which are pivoted upon the face of such cap, the keepers, the springs, and the pawls being applied upon the cap near the periphery of the same, and a securing-pin which extends through the transverse perforation in the detachable cap and also through the transverse perforation in the axle-tree.

17. The combination, with the frame A, of the bars L L', the journal-pins K and K', and the securing-cap I'.

18. The combination, with the frame A, of the bars L and L', connected by toothed caps h and h', the journal-pins K and K', and the securing-cap I'.

19. The combination, in a grain-drill, of a hopper the bottom of which is provided with a series of discharge-openings, a regulating-slide upon the bottom of the hopper, undercut projections corresponding to the openings in the bottom of the hopper upon such slide, and a series of stops corresponding to the projections upon the slide secured upon the bottom of the hopper at one side of the openings therein.

20. The combination, in a grain-drill, of a hopper which is mounted upon the frame of the drill, a series of discharge-openings in the bottom of the hopper, an independent non-discharging opening in the bottom of the hopper, a regulating-slide for controlling the discharge-openings, downwardly-extending projections corresponding to the independent opening upon the bottom of the regulating-slide, a lever which is secured to the drill, and projections upon the upper end of the lever which extend into the independent opening and engage with the projections upon the bottom of the regulating-slide.

21. The combination, in a grain-drill, of a hopper which is mounted upon the frame of the drill, a series of discharge-openings in the bottom of the hopper, an independent non-discharging-opening in the bottom of the hopper, a regulating-slide for controlling the discharge-openings, downwardly-extending projections, corresponding to the independent opening upon the bottom of the regulating-slide, a lever which is secured to the drill, projections which extend into the independent opening and engage therein with the projections upon the bottom of the regulating-slide upon the upper end of the lever, and an adjusting-screw which is connected to the lever which actuates the regulating-slide.

22. The combination, in a grain-drill, of a frame which is composed of longitudinal and transverse bars, an axle-tree which is journaled upon the frame, traveling wheels upon the axle-tree, actuating-caps which are provided with keepers and pawls as described, and pins which engage the actuating-caps and the axle-tree, and secure both the wheels and the caps in their only operative position.

In testimony whereof I hereunto sign my name.

JOHN F. KELLER.

Witnesses:
 DANIEL BREED,
 A. J. LEDANE.